US008178247B2

United States Patent
Katano et al.

(10) Patent No.: US 8,178,247 B2
(45) Date of Patent: May 15, 2012

(54) FUEL CELL SYSTEM AND ITS OPERATION STOP METHOD

(75) Inventors: Koji Katano, Toyota (JP); Norio Yamagishi, Aichi (JP); Akihisa Hotta, Ichinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1044 days.

(21) Appl. No.: 12/084,574

(22) PCT Filed: Dec. 21, 2006

(86) PCT No.: PCT/JP2006/326166
§ 371 (c)(1),
(2), (4) Date: May 6, 2008

(87) PCT Pub. No.: WO2007/077904
PCT Pub. Date: Jul. 12, 2007

(65) Prior Publication Data
US 2009/0252997 A1    Oct. 8, 2009

(30) Foreign Application Priority Data

Jan. 6, 2006 (JP) .................................. 2006-001858
Sep. 7, 2006 (JP) .................................. 2006-243179

(51) Int. Cl.
*H01M 8/00* (2006.01)
(52) U.S. Cl. .......................... 429/400; 429/428; 429/443
(58) Field of Classification Search .................. 429/400, 429/428, 443
See application file for complete search history.

(56) References Cited

U.S. PATENT DOCUMENTS 6,161,783 A * 12/2000 Press ........................ 239/585.3
2006/0083967 A1 * 4/2006 Sakai ............................. 429/24

FOREIGN PATENT DOCUMENTS

| JP | 5-1641 A | 1/1993 |
| JP | 5-39883 A | 2/1993 |
| JP | 06-275300 A | 9/1994 |
| JP | 8-144859 A | 6/1996 |
| JP | 2003-203665 A | 7/2003 |
| JP | 2004-139984 A | 5/2004 |
| JP | 2005-11779 A | 1/2005 |
| JP | 2005-276764 A | 10/2005 |
| JP | 2005-327596 A | 11/2005 |
| JP | 2005-337404 A | 12/2005 |
| JP | 2006-127830 A | 5/2006 |

* cited by examiner

*Primary Examiner* — Jane Rhee
(74) *Attorney, Agent, or Firm* — Kenyon & Kenyon LLP

(57) ABSTRACT

The present invention provides a fuel cell system including a fuel cell, a hydrogen gas pipe system for supplying a fuel gas to the fuel cell, and an injector for adjusting a pressure of the upstream side of the hydrogen gas pipe system to supply the hydrogen gas to the downstream side, wherein the injector includes an internal channel for communicating the upstream side of the injector with the downstream side of the injector, and a valve body movably arranged in the internal channel for switching a channel opening area in multiple stages corresponding to a movement position of the valve body, and wherein water at least around the valve body of the injector is reduced when the system stops.

11 Claims, 6 Drawing Sheets

FUEL CELL SYSTEM AND ITS OPERATION STOP METHOD

This is a 371 national phase application of PCT/JP2006/326166 filed 21 Dec. 2006, which claims priority of Japanese Patent Applications No. 2006-001858 filed 06 Jan. 2006, and No. 2006-243179 filed 07 Sep. 2006, respectively, the contents of which are incorporated herein by reference.

TECHNICAL FIELD

The present invention relates to a fuel cell system in which a gas supply system of a fuel cell is provided with an injector, and an operation stop method of the system.

BACKGROUND ART

At present, a fuel cell system including a fuel cell that receives supply of a reactant gas (a fuel gas and an oxidizing gas) to generate power has been proposed and put to practical use. Such a fuel cell system is provided with a fuel supply channel for introducing the fuel gas to be supplied from a fuel supply source such as a hydrogen tank into the fuel cell.

Meanwhile, a pressure adjustment valve (a regulator) which reduces a supply pressure to a certain value is generally disposed along a fuel supply channel, when the supply pressure of the fuel gas from the fuel supply source is remarkably high. In recent years, a technology is proposed in which a mechanical variable pressure adjustment valve (a variable regulator) for changing the supply pressure of the fuel gas in, for example, two stages is disposed along the fuel supply channel, whereby the supply pressure of the fuel gas is changed based on an operation state of the system (e.g., see Japanese Patent Application Laid-Open JP2004-139984A).

DISCLOSURE OF THE INVENTION

However, it has been difficult to quickly change a supply pressure of a fuel gas (i.e., response is low) owing to a structure of the conventional mechanical variable pressure adjustment valve described in JP2004-139984A mentioned above, and further, high-precision pressure adjustment in which a target pressure is changed over multiple stages have not been able to be performed.

Moreover, since the conventional mechanical variable pressure adjustment valve has a comparatively complicated constitution, the valve has a large size and a large weight, so costs of manufacturing increase. Furthermore, since the conventional mechanical variable pressure adjustment valve simply changes the supply pressure of the fuel gas, a shutoff valve for intercepting supply of the fuel gas needs to be separately disposed. Therefore, problems of enlargement of the system (enlargement of an installation space) and increase of equipment costs are caused.

To solve the problem, there has been demanded a highly responsive fuel cell system capable of appropriately changing the supply pressure of the fuel gas based on an operation state of a fuel cell. However, water produced on the side of an oxidizing gas supply system in accordance with power generation of the fuel cell passes through the fuel cell and enters a fuel supply system of the fuel cell system. Therefore, if the water remaining at the pressure adjustment valve freezes, a stable operation of the pressure adjustment valve on low-temperature start-up is disturbed.

The present invention has been achieved in view of such a situation, and an object is to provide a highly-responsive fuel cell system which stably operates even on low-temperature start-up and in which a supply pressure of the fuel gas can appropriately be changed based on an operation state of a fuel cell, and an operation stop method of the system.

To achieve the above-mentioned object, a fuel cell system of the present invention comprises: a fuel cell; a gas supply system for supplying a reactant gas to the fuel cell; and an injector for adjusting a gas state on an upstream side of the gas supply system to supply the gas to a downstream side, wherein: the injector includes an internal channel for communicating the upstream side of the injector with the downstream side of the injector, and a valve body movably arranged in the internal channel for changing an open/closed state of the channel; and the system further including water reduction means for reducing water at least around the valve body of the injector when or after the system stops.

According to this constitution, based on the operation state of the fuel cell (generated power (power, current, and voltage) of the fuel cell, a temperature of the fuel cell, an abnormal state of the fuel cell system, an abnormal state of a fuel cell main body, etc.), an operation state of the injector (an open degree of the valve body of the injector (a passage area of the gas), an open time of the valve body of the injector (a jet time of the gas), etc.) can be set. Therefore, the supply pressure of the fuel gas can appropriately be changed based on the operation state of the fuel cell, and response can be improved. It is noted that the "gas state" means a state (a flow rate, a pressure, a temperature, a molar concentration or the like) of the gas, and especially includes at least one of the gas flow rate and the gas pressure.

Moreover, the water reduction means reduces the water around the valve body as a movable portion in the injector when the system stops. Therefore, even when the fuel cell system is exposed to a low temperature environment, fixation of the valve body due to freezing of the water in the injector can be inhibited.

The injector may include a valve body driving part (e.g., a solenoid) for driving the valve body by application of current, and the water reduction means may control the application of the current to the valve body driving part to reduce the water around the valve body.

According to this constitution, since a temperature of a reactant gas is raised by heat generation of the valve body driving part due to the application of the current, at least a part of the water around the valve body that has vaporized owing to the temperature rise is easily discharged from the injector. Since the reactant gas is used as a temperature raising gas, another pipe system or the like for supplying the temperature raising gas does not have to be added.

The water reduction means may apply a current for retaining a closed valve state to the valve body driving part of the injector to raise a temperature of the reactant gas, and then open a valve of the injector.

According to this constitution, since the temperature of the reactant gas is raised by the valve body driving part while the injector remain in the closed valve state, a water reduction process can be performed with a less amount of the gas.

In the fuel cell system of the present invention, the injector is disposed in a fuel gas supply system which communicates with a fuel electrode side of the fuel cell, and the water reduction means may reduce a pressure on the fuel electrode side of the fuel cell to lower than a target pressure after the system stops, before the valve of the injector is opened.

According to this constitution, since the pressure on the fuel electrode side is reduced to lower than a predetermined target pressure by performing the power generation of the fuel cell in a state, for example, in which the fuel supply is intercepted, the vaporization of the water in the injector disposed in the fuel gas supply system can be promoted.

The system further includes a shutoff valve for intercepting the gas supply from a reactant gas supply source on the upstream side of the injector, wherein the water reduction means may close the shutoff valve, then continuously applies a current required for opening the valve of the injector (a so-called inrush current) to the valve body driving part, open the shutoff valve to supply the reactant gas from the reactant gas supply source to the injector, and after that, close the valve of the injector and close the shutoff valve.

According to this constitution, since the shutoff valve closes, any reactant gas is not supplied to the injector, even when the valve of the injector opens. In addition, the current required for opening the valve of the injector, that is, a current larger than a so-called open valve state retaining current is continuously applied to the solenoid. Therefore, the temperature of the gas in the injector can be raised in a short time, and the water in the injector can efficiently vaporize.

When the shutoff valve is opened from this state, the temperature raising gas in the injector is pushed out of the injector together with the water in which at least a part of the water is vaporized owing to the reactant gas supplied from the upstream side (the reactant gas supply source) of the shutoff valve. Afterward, the valve of the injector is closed, and the shutoff valve is closed, whereby the water reduction process is completed.

The fuel cell system of the present invention may further include: a circulation channel for returning an off-gas of the reactant gas discharged from the fuel cell to the fuel cell; and a pump disposed in the circulation channel, wherein the water reduction means may perform a process to reduce the water around the valve body in a case where a rotation number of the pump is less than or equal to a predetermined rotation number.

According to this constitution, in a state in which the rotation number of the pump is sufficiently small and there is not any water splash from the circulation channel on the downstream side of a gas flow from the injector, the water reduction process can be performed.

The water reduction means may perform the process to reduce the water around the valve body after ending all of power generation by the fuel cell (including, for example, the power generation for consumption of the reactant gas and the power generation for the pressure reduction of the gas supply system those are performed after receiving a system stop command).

According to this constitution, the water reduction process is performed in a state in which the production of the water accompanying the power generation and the supply of the gas required for the power generation are not performed, so that attachment of the water to the valve body in the injector is inhibited.

The water reduction means may, for example, apply a current for retaining the closed valve state to the valve body driving part of the injector for a predetermined time, and then stop the application of the current, as a dew condensation inhibiting process that is one mode of the water reduction process.

According to this constitution, a weak current smaller than the open valve state retaining current flows through the valve body driving part of the injector for a predetermined time, whereby the valve body driving part generates heat to raise the temperature of the injector. Therefore, dew condensation is generated earlier in the pipe of the gas supply system than in the injector, so that the generation of the dew condensation in the injector is inhibited.

The predetermined time may be set based on a temperature of outside air or the fuel cell.

According to this constitution, it is possible to optimize a time to apply the closed valve retaining current and reduce a time required for a system stop process including the dew condensation inhibiting process.

The water reduction means may intermittently apply the current to the valve body driving part of the injector after the system stops. Turning on/off of the current during the intermittent application of the current is controlled by, for example, a timer.

The water reduction means may apply the current to the valve body driving part of the injector in a case where generation of dew condensation around the valve body of the injector is predicted.

According to this constitution, execution of the dew condensation inhibiting process, which is unnecessary in a case where the dew condensation is not possibly generated, can be omitted. On the other hand, even in a case where, despite execution of the dew condensation inhibiting process on the system stop, the dew condensation may be generated owing to an environmental change or the like, generation of the dew condensation can be inhibited.

An operation stop method of a fuel cell system according to the present invention is an operation stop method of a fuel cell system including a fuel cell, a gas supply system for supplying a reactant gas to the fuel cell and an injector for adjusting a gas state on an upstream side of the gas supply system to supply the gas to a downstream side, the method comprising a step of reducing water at least around a valve body disposed in an internal channel of the injector when the system stops.

According to this constitution, since the water around the valve body as the movable portion in the injector is reduced when the system stops, even if the fuel cell system is exposed to a low temperature environment, fixation of the valve body due to freezing of the water in the injector is inhibited.

According to the present invention, since the water present around the valve body of the injector can be reduced when the system stops, an operation defect due to the freezing in the injector can be inhibited, and start reliability in the low temperature environment can be improved.

BEST MODE FOR CARRYING OUT THE INVENTION

A fuel cell system 1 according to an embodiment of the present invention will hereinafter be described with reference to the drawings. In the present embodiment, an example will be described in which the present invention is applied to a car mounted power generation system of a fuel cell vehicle (a mobile body).

First, a constitution of the fuel cell system 1 according to the embodiment of the present invention will be described with reference to FIG. 1.

Figure 1:
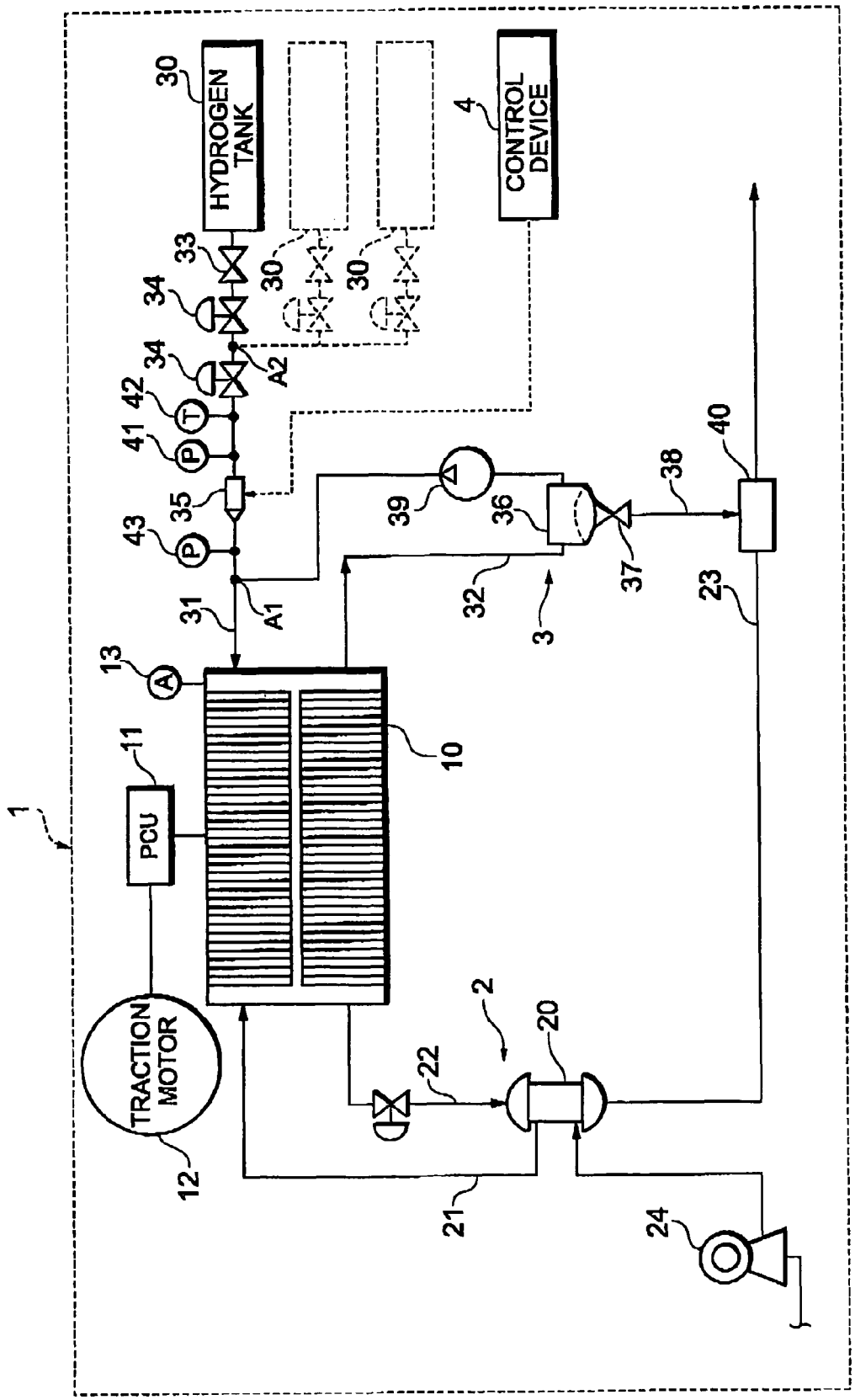
FIG. 1 is a constitution diagram of a fuel cell system according to an embodiment of the present invention.

As shown in FIG. 1, the fuel cell system 1 according to the present embodiment includes a fuel cell 10 which receives supply of a reactant gas (an oxidizing gas and a fuel gas) to generate power, an oxidizing gas pipe system 2 which supplies air as the oxidizing gas to the fuel cell 10, a hydrogen gas pipe system 3 which supplies a hydrogen gas as the fuel gas to the fuel cell 10, a control device 4 which generally controls the whole system and the like.

The fuel cell 10 has a stack structure constituted by laminating the required number of single cells those receive the supply of the reactant gas to generate the power. The power generated in the fuel cell 10 is supplied to a power control unit (PCU) 11. The PCU 11 includes an inverter, a DC-DC converter and the like arranged between the fuel cell 10 and a traction motor 12. A current sensor 13 for detecting a current that is being generated is attached to the fuel cell 10.

The oxidizing gas pipe system 2 includes an air supply channel 21 that supplies the oxidizing gas (air) humidified by a humidifier 20 to the fuel cell 10, an air discharge channel 22 that guides an oxidizing off gas discharged from the fuel cell 10 to the humidifier 20, and an exhaust channel 23 for guiding the oxidizing off gas from the humidifier 20 to the outside. The air supply channel 21 is provided with a compressor 24 that takes in the oxidizing gas in the atmosphere to feed the gas to the humidifier 20 under pressure.

The hydrogen gas pipe system 3 includes a hydrogen tank 30 as a fuel supply source (a reactant gas supply source) in which the hydrogen gas is stored at a high pressure (e.g., 70 MPa), a hydrogen supply channel 31 as a fuel supply channel for supplying the hydrogen gas in the hydrogen tank 30 to the fuel cell 10, and a circulation channel 32 for returning a hydrogen off gas (an off-gas of the reactant gas) discharged from the fuel cell 10 to the hydrogen supply channel 31. The hydrogen gas pipe system 3 is one embodiment of the gas supply system according to the present invention.

It is noted that instead of the hydrogen tank 30, a reformer that produces a hydrogen-rich reformed gas from a hydrogen-carbide-based fuel, and a high pressure gas tank that accumulates and stores the reformed gas produced by the reformer at a high pressure may be employed as the fuel supply source. Moreover, a tank having a hydrogen absorbing alloy may be employed as the fuel supply source.

The hydrogen supply channel 31 is provided with a shutoff valve 33 that intercepts or allows the supply of the hydrogen gas from the hydrogen tank 30, regulators 34 those adjust a pressure of the hydrogen gas, and an injector 35. On an upstream side of the injector 35, there are disposed a primary side pressure sensor 41 and a temperature sensor 42 which detect a pressure and a temperature of the hydrogen gas in the hydrogen supply channel 31, respectively. On a downstream side of the injector 35 and an upstream side of a junction of the hydrogen supply channel 31 and the circulation channel 32, there is disposed a secondary side pressure sensor 43 which detects the pressure of the hydrogen gas in the hydrogen supply channel 31.

The regulator 34 is a device that adjusts the pressure (the primary pressure) on the upstream side of the device into a preset secondary pressure. In the present embodiment, a mechanical pressure reduction valve that reduces the primary pressure is employed as the regulator 34. As a constitution of the mechanical pressure reduction valve, a known constitution may be employed in which the valve has a housing including a back pressure chamber and a pressure adjustment chamber formed separately via a diaphragm and in which the primary pressure is reduced to a predetermined pressure to be the secondary pressure in the pressure adjustment chamber based on a back pressure in the back pressure chamber.

In the present embodiment, as shown in FIG. 1, two regulators 34 are arranged on the upstream side of the injector 35, so that the pressure on the upstream side of the injector 35 can effectively be reduced. Therefore, a degree of freedom in design of a mechanical structure (a valve body, a housing, a channel, a driving device, etc.) of the injector 35 can be improved.

Moreover, since the pressure on the upstream side of the injector 35 can be reduced, it can be prevented that the valve body 65 of the injector 35 does not easily move owing to increase of a differential pressure between the upstream side pressure and the downstream side pressure of the injector 35. Therefore, a range of variable pressure adjustment of the pressure on the downstream side of the injector 35 can be enlarged, and a drop of response of the injector 35 can be inhibited.

The injector 35 is an electromagnetic driving type openable/closable valve in which the valve body 65 can directly be driven by an electromagnetic driving force at a predetermined driving cycle, and detached from a valve seat to adjust a gas state such as a gas flow rate or a gas pressure. That is, in the injector 35, the valve (the valve body and the valve seat) is directly driven to open or close by the electromagnetic driving force, the driving cycle of the valve is controllable to a region of high response, and the injector therefore has high response.

Figure 3:
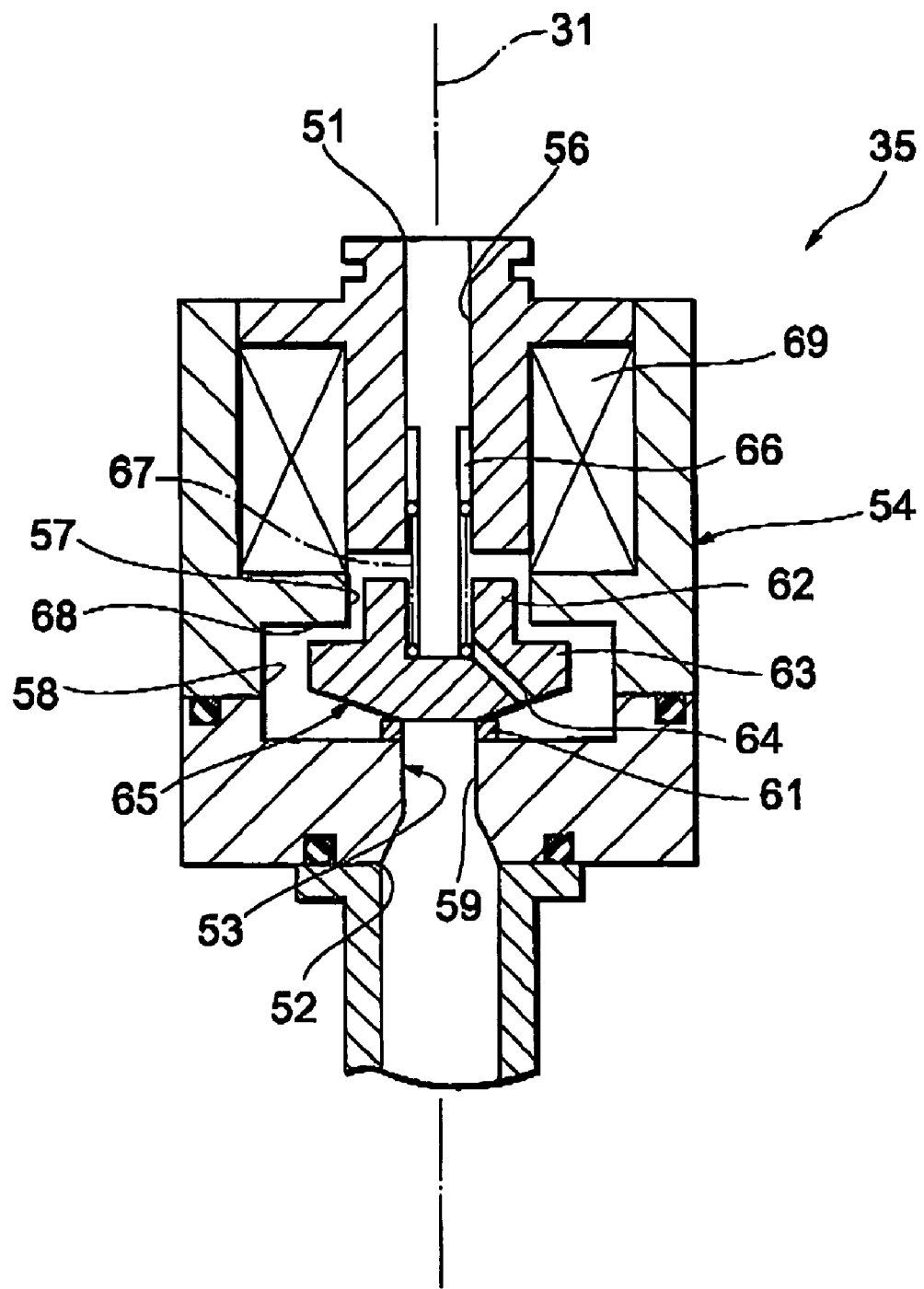
FIG. 3 is a longitudinal sectional view of an injector for use in the fuel cell system shown in FIG. 1

FIG. 3 is a sectional view showing one embodiment of the injector 35. The injector 35 has a metal-made cylinder 54 provided with an internal channel 53 which constitutes a part of the hydrogen supply channel (a fuel supply system) 31, and which is disposed in a manner that one port portion 51 of the internal channel 53 is placed on the hydrogen tank 30 side of the hydrogen supply channel 31, and the other port portion 52 of the internal channel 53 is placed on the fuel cell 10 side of the hydrogen supply channel 31. The cylinder 54 is provided with a first passage portion 56 connected to the port portion 51, a second passage portion 57 connected to the first passage portion 56 on the side opposite to the port portion 51 and having a diameter larger than that of the first passage portion 56, a third passage portion 58 connected to the second passage portion 57 on the side opposite to the first passage portion 56 and having a diameter larger than that of the second passage portion 57, and a fourth passage portion 59 connected to the third passage portion 58 on the side opposite to the second passage portion 57 and having a diameter smaller than that of the second passage portion 57 or the third passage portion 58. These portions constitute the internal channel 53.

Moreover, the injector 35 has a valve seat 61 constituted of a sealing member disposed so as to surround an opening of the fourth passage portion 59 on the side of the third passage portion 58; the metal-made valve body 65 which has a cylindrical portion 62 to be movably inserted into the second passage portion 57 and an umbrella portion 63 arranged in the third passage portion 58 and having a diameter larger than that of the second passage portion 57 and which is provided with a communication hole 64 obliquely formed in the umbrella portion 63; a spring 67 having one end inserted into the cylindrical portion 62 of the valve body 65 and having the other end engaged with a stopper 66 formed in the first passage portion 56, whereby the valve body 65 is allowed to come into contact with the valve seat 61, and the internal channel 53 is intercepted; and a solenoid (a valve body driving part) 69 which moves the valve body 65 against an urging power of the spring 67 until the valve body come contact with a stepped portion 68 of the third passage portion 58 on the side of the second passage portion 57, whereby the valve body 65 is allowed to come away from the valve seat 61, so that the internal channel 53 is opened through the communication hole 64.

In the present embodiment, the valve body 65 of the injector 35 is driven by controlling application of current to the solenoid 69 which is an electromagnetic driving device, and a pulsed exciting current to be supplied to the solenoid 69 is turned on or off, so that an open time (a time in open valve state) or an opening area of the internal channel 53 can be switched in two stages, multiple stages, a continuous (stepless) manner, or a linear manner. That is, as a control method of an open/closed state of the injector 35, there are at least a method of changing the valve open time and a method of changing the opening area.

Then, in response to a control signal output from the control device 4, a gas jet time and a gas jet timing of the injector 35 are controlled, whereby a flow rate and a pressure of the hydrogen gas are highly precisely controlled.

As described above, in order to supply the gas to the downstream side of the injector 35 at the required flow rate, at least one of the opening area (an open degree) and the open time of the valve body 65 disposed in the internal channel 53 of the injector 35 is changed, whereby the flow rate (or a hydrogen molar concentration) of the gas to be supplied to the downstream side (the fuel cell 10 side) is adjusted.

It is noted that since the valve body 65 of the injector 35 is opened or closed to adjust the gas flow rate, and further the pressure of the gas to be supplied to the downstream side of the injector 35 is reduced below an upstream gas pressure of the injector 35, the injector 35 can be interpreted as a pressure adjustment valve (a pressure reduction valve, a regulator). In the present embodiment, the injector can be interpreted as a variable pressure adjustment valve capable of changing a pressure adjustment amount (a pressure reduction amount) of the upstream gas pressure of the injector 35 based on gas requirement so that the pressure matches with a required pressure in a predetermined pressure range.

It is noted that in the present embodiment, as shown in FIG. 1, the injector 35 is arranged on the upstream side from a junction A1 of the hydrogen supply channel 31 and the circulation channel 32. Moreover, as shown by broken lines in FIG. 1, when a plurality of hydrogen tanks 30 are employed as the fuel supply source, the injector 35 is arranged on the downstream side from a portion (a hydrogen gas junction A2) where hydrogen gases supplied from the respective hydrogen tanks 30 join one another.

The circulation channel 32 is connected to a discharge channel 38 via a gas-liquid separator 36 and a gas and water discharge valve 37. The gas-liquid separator 36 collects water from the hydrogen off gas. The gas and water discharge valve 37 operates in response to an instruction from the control device 4 to discharge (purge), to the outside, the water collected by the gas-liquid separator 36 and the hydrogen off gas including impurities in the circulation channel 32.

Moreover, the circulation channel 32 is provided with a hydrogen pump 39 that pressurizes the hydrogen off gas in the circulation channel 32 to feed the gas toward the hydrogen supply channel 31. It is noted that the hydrogen off gas is discharged via the gas and water discharge valve 37 and the discharge channel 38, and then is diluted by a diluting unit 40 to join the oxidizing off gas in the exhaust channel 23.

The control device 4 detects an operation amount of an accelerating operation device (an accelerator or the like) disposed in a vehicle, and receives control information such as a required acceleration value (e.g., generated power required from a load device such as the traction motor 12) to control operations of various devices in the system.

It is noted that, in addition to the traction motor 12, the load device generically refers to an auxiliary machine (e.g., a motor of the compressor 24, the hydrogen pump 39, a cooling pump or the like) necessary for operating the fuel cell 10, an actuator for use in various devices (a change gear, a wheel control device, a steering device, a suspension device, etc.) concerned with running of the vehicle, and a power consumption device including an air conditioning device (an air conditioner), an illumination lamp, an audio unit and the like of a passenger space.

The control device 4 is constituted of a computer system (not shown). Such a computer system includes a CPU, an ROM, an RAM, an HDD, an input/output interface, a display and the like, and the CPU reads and executes various control programs recorded in the ROM to realize various control operations.

Figure 2:
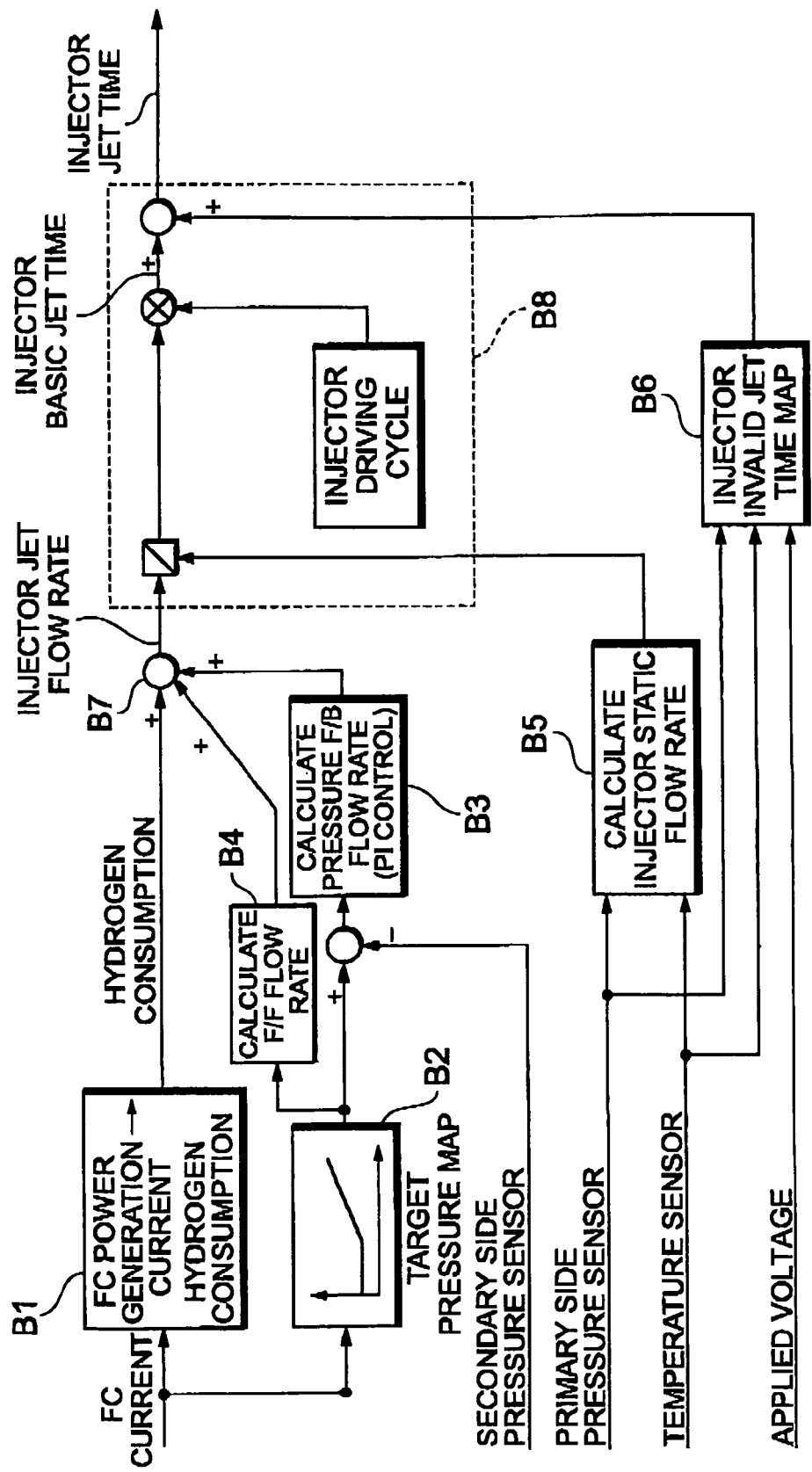
FIG. 2 is a control block diagram showing a control configuration of a control device of the fuel cell system shown in FIG. 1.

Specifically, as shown in FIG. 2, the control device 4 calculates an amount (hereinafter referred to as the "hydrogen consumption") of the hydrogen gas to be consumed by the fuel cell 10 based on the operation state of the fuel cell 10 (a current value of the fuel cell 10 detected by the current sensor 13 during power generation) (a fuel consumption calculating function: B1). In the present embodiment, the hydrogen consumption is calculated and updated for each calculation cycle of the control device 4 by use of a specific calculation formula indicating a relation between the current value of the fuel cell 10 and the hydrogen consumption.

Moreover, the control device 4 calculates a target pressure value (a target gas supply pressure to the fuel cell 10) of the hydrogen gas at a downstream position of the injector 35 based on the operation state of the fuel cell 10 (the current value of the fuel cell 10 detected by the current sensor 13 during the power generation) (a target pressure value calculating function: B2). In the present embodiment, the target pressure value at a position where the secondary side pressure sensor 43 is arranged (a pressure adjustment position as a position where pressure adjustment is required) is calculated and updated for each calculation cycle of the control device 4 by use of a specific map indicating a relation between the current value of the fuel cell 10 and the target pressure value.

Furthermore, the control device 4 calculates a feedback correction flow rate based on a deviation between the calculated target pressure value and the detected pressure value at the downstream position (the pressure adjustment position) of the injector 35 detected by the secondary side pressure sensor 43 (a feedback correction flow rate calculating function: B3). The feedback correction flow rate is a hydrogen gas flow rate (a pressure difference reduction correcting flow rate) to be added to the hydrogen consumption in order to reduce the deviation between the target pressure value and the detected pressure value. In the present embodiment, the feedback correction flow rate is calculated and updated for each calculation cycle of the control device 4 by use of a target following type control rule of PI control or the like.

In addition, the control device 4 calculates a feedforward correction flow rate corresponding to a deviation between the previously calculated target pressure value and the presently calculated target pressure value (a feedforward correction flow rate calculating function: B4). The feedforward correction flow rate is a fluctuation (a correction flow rate corresponding to a pressure difference) of the hydrogen gas flow rate due to a fluctuation of the target pressure value. In the present embodiment, the feedforward correction flow rate is calculated and updated for each calculation cycle of the control device 4 by use of a specific calculation formula indicating a relation between the deviation of the target pressure value and the feedforward correction flow rate.

Moreover, the control device 4 calculates a static flow rate upstream of the injector 35 based on the gas state on the upstream side of injector 35 (the pressure of the hydrogen gas detected by the primary side pressure sensor 41 and the temperature of the hydrogen gas detected by the temperature sensor 42) (a static flow rate calculating function: B5). In the present embodiment, the static flow rate is calculated and updated for each calculation cycle of the control device 4 by use of a specific calculation formula indicating a relation between the pressure and the temperature of the hydrogen gas on the upstream side of the injector 35 and the static flow rate.

Furthermore, the control device 4 calculates an invalid jet time of the injector 35 based on the gas state on the upstream side of the injector 35 (the pressure and the temperature of the hydrogen gas) and an applied voltage (an invalid jet time calculating function: B6). Here, the invalid jet time is a time from when the injector 35 receives the control signal from the control device 4 until when jetting is actually started. In the present embodiment, the invalid jet time is calculated and updated for each calculation cycle of the control device 4 by use of a specific map indicating a relation between the pressure and the temperature of the hydrogen gas on the upstream side of the injector 35 and the applied voltage and the invalid jet time.

In addition, the control device 4 adds up the hydrogen consumption, the feedback correction flow rate, and the feedforward correction flow rate to calculate a jet flow rate of the injector 35 (a jet flow rate calculating function: B7). Then, the control device 4 multiplies a driving cycle of the injector 35 by a value obtained by dividing the jet flow rate of the injector 35 by the static flow rate, to calculate a basic jet time of the injector 35, and the device further adds up this basic jet time and the invalid jet time to calculate a total jet time of the injector 35 (a total jet time calculating function: B8).

Here, the driving cycle is a cycle of a stepped (on/off) waveform indicating an open/closed state of a jet hole of the injector 35. In the present embodiment, the driving cycle is set to a certain value by the control device 4.

Then, the control device 4 outputs a control signal for realizing the total jet time of the injector 35 calculated by the above-mentioned procedure, to control the gas jet time and the gas jet timing of the injector 35, whereby the flow rate and the pressure of the hydrogen gas to be supplied to the fuel cell 10 are adjusted.

During a usual operation of the fuel cell system 1, the hydrogen gas is supplied from the hydrogen tank 30 to a fuel electrode of the fuel cell 10 via the hydrogen supply channel 31, and further humidified and adjusted air is supplied to an oxidizing electrode of the fuel cell 10 via the air supply channel 21, whereby power generation is performed. At this time, the power (required power) to be derived from the fuel cell 10 is calculated by the control device 4, and the hydrogen gas and the air are supplied into the fuel cell 10 as much as an amount corresponding to the generated power. In the present embodiment, during such a usual operation, the pressure of the hydrogen gas to be supplied to the fuel cell 10 is highly precisely controlled.

Meanwhile, the injector 35 is also a valve which partitions a humidification side (the fuel cell 10 side) and a dry side (the hydrogen tank 30 side), and therefore performance of a measure against freeze of the injector is important in realizing low-temperature (e.g., below a freezing point) start-up. In a case where the fuel cell system 1 stops in a state in which the water in the injector 35 is not reduced and a temperature drops to a freezing point on the next start-up of the system, the valve body 65 may be fixed due to freezing of the water, and an operation defect may be caused.

As a method of reducing the water in the injector 35, it is conceivable that while the valve body 65 of the injector 35 is kept in an open valve state, the hydrogen gas is circulated through the internal channel to sweep the internal channel by this hydrogen gas. However, in this case, a large amount of the hydrogen gas is supplied to the fuel cell 10, so a problem that fuel efficiency deteriorates is caused.

To solve the problem, in the fuel cell system 1 of the present embodiment, in order to reduce the water in the injector 35 while suppressing drop of the fuel efficiency, a water reduction process (a sweep process) to reduce the water in the injector 35 is performed when the system stops. The water reduction process is controlled by the control device 4. That is, the control device 4 of the present embodiment is one embodiment of water reduction means for performing control of application of current to the injector 35 and control of opening and closing of the shutoff valve 33 and the like.

During the usual operation, the injector 35 is cooled by the hydrogen gas supplied from the hydrogen tank 30. However, in a state in which the flow of the hydrogen gas stops, the hydrogen gas in the injector 35 is heated by the heat generated by the solenoid 69. Therefore, on receiving a system stop command such as ignition OFF (on the system stop), the control device 4 applies a closed valve state retaining current for retaining the closed valve state to the solenoid 69 of the injector 35.

When the solenoid 69 generates the heat by the application of the current, the temperature of the hydrogen gas remaining in the injector 35 is raised by the solenoid 69 that has generated the heat. In consequence, a part of the water present around at least the valve body 65 vaporizes. Subsequently, the control device 4 cancels the closed valve state to open the valve of the injector 35, and further continuously applies a current for retaining this open valve state to the solenoid 69, thereby opening the valve of the injector 35.

Then, together with the hydrogen gas supplied from the hydrogen tank 30, the water present around the valve body 65 and partially vaporized by the hydrogen gas raised in temperature is discharged from the injector 35. Furthermore, since the hydrogen gas having the raised temperature raises the temperatures of the injector 35 including the valve body 65 and the pipe on the downstream side of the injector, subsequent water dew condensation is also inhibited.

As described above, according to the fuel cell system 1 of the present embodiment, the water present around the valve body 65 can efficiently be vaporized, discharged and reduced with less hydrogen gas. That is, while suppressing the drop of the fuel efficiency, the water in the injector 35 can be reduced. Therefore, the operation defect of the injector 35 due to the freezing on the next start-up in the low temperature can be inhibited, and the start-up reliability in the low temperature environment can be improved.

Moreover, according to the fuel cell system 1 of the present embodiment, the operation state (the jet time) of the injector 35 can be set based on the operation state (the current value during the power generation) of the fuel cell 10. Therefore, the supply pressure of the hydrogen gas can appropriately be changed based on the operation state of the fuel cell 10, and the response can be improved. Since the injector 35 is employed as the flow rate adjustment valve and the variable pressure adjustment valve of the hydrogen gas, high-precision pressure adjustment (the adjustment of the supply pressure of the hydrogen gas supplied to the fuel cell 10) can be performed.

That is, since the injector 35 can receive the control signal from the control device 4 based on the operation state of the fuel cell 10 to adjust the jet time and the jet timing of the hydrogen gas, the pressure adjustment can more quickly and accurately be performed as compared with the conventional mechanical variable pressure adjustment valve. Since the injector 35 is small-sized, lightweight and inexpensive as compared with the conventional mechanical variable pressure adjustment valve, miniaturization and cost reduction of the whole system can be realized.

The above-mentioned embodiment is an example to describe the present invention, the present invention is not limited to this example, and various constituting components can appropriately be designed without departing from the scope of the present invention. Moreover, the other embodiments described later may appropriately be combined and applied to the above-mentioned embodiment.

For example, in the above water reduction process, the control device 4 may perform control to reduce the pressure on the side of the fuel electrode before the valve of the injector 35 opens. Specifically, after the valve of the injector 35 is closed, the control device 4 bring the fuel cell 10 into generating operation in a state, for example, in which the hydrogen gas supply is intercepted, to reduce the pressure on the side of the fuel electrode to a lower pressure than a predetermined target pressure.

Figure 4:
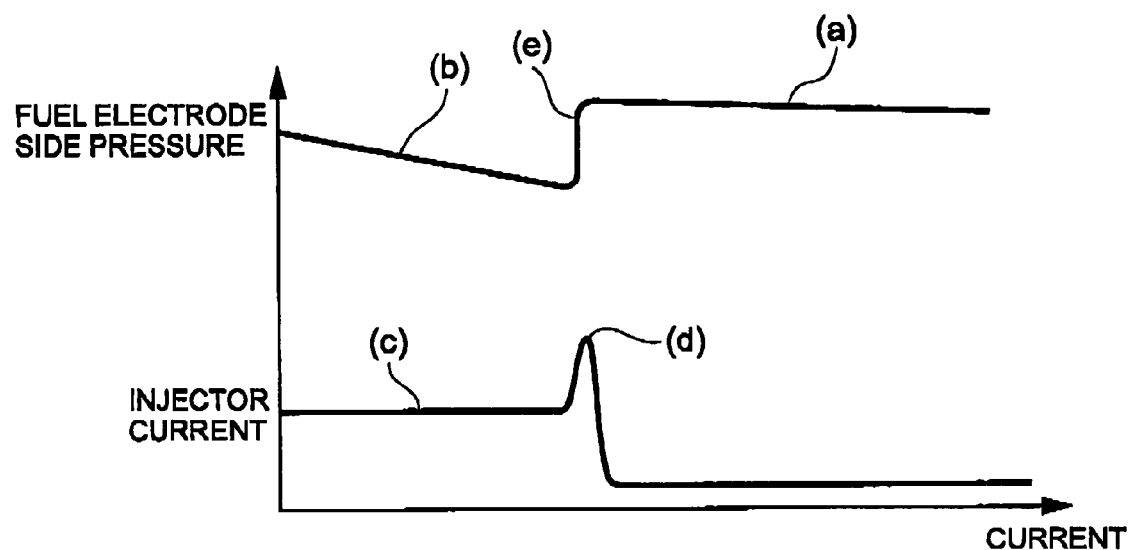
FIG. 4 is a diagram showing a relation between a current to be applied to the injector and a pressure on the a fuel electrode side according to another embodiment of the fuel cell system shown in FIG. 1.

That is, as shown in FIG. 4, in a state in which the hydrogen gas supply is cut off, the fuel cell 10 is allowed to generate the power so that the pressure of the hydrogen supply channel 31 is reduced beforehand to a lower pressure (symbol b) than the final target pressure (symbol a) after the system finally stops. During this pressure reduction process, a current is applied to the solenoid 69 in a manner that the closed valve state of the injector 35 is retained (not cancelled) as described above to raise the temperature of the hydrogen gas in the injector 35 (symbol c).

Afterward, when an inrush current required for opening the valve of the injector 35 is applied to the solenoid 69 as shown by symbol d, the hydrogen gas from the hydrogen tank 30 flows into the injector 35 to blow away the water present around the valve body 65. Moreover, as shown by symbol e, the pressure on the fuel electrode side rises to reach the target pressure (symbol a).

As described above, according to the present embodiment, the pressure of the fuel cell 10 on the fuel electrode side is reduced, whereby the vaporization of the water in the injector 35 disposed in the hydrogen supply channel 31 is promoted. The control of the target pressure after the system end can highly precisely be performed as compared with a case where the control is performed by the gas and water discharge valve 37.

That is, since a fluid to be controlled is a mixture of a gas and a liquid in the pressure control by the gas and water discharge valve 37, there is a limitation to the improvement of the precision. Since the controlled pressure is low, a diameter of the valve has to be increased, and this is disadvantage for the improvement of the response. On the other hand, according to the pressure control using the injector 35 as in the present embodiment, the pressure can highly precisely be controlled into the target pressure after the system stop.

Therefore, a cross leak amount of the hydrogen gas to an oxygen electrode side decreases when the system stops, and the fuel efficiency can be improved.

Moreover, as the water reduction process, the control device 4 may close the shutoff valve 33, then continuously apply the inrush current (the inrush current>the open valve state retaining current) required for opening the valve of the injector 35 to the solenoid 69, open the shutoff valve 33 to supply the hydrogen gas from the hydrogen tank 30 to the injector 35 by the continuous application of the current, then close the valve of the injector 35, and close the shutoff valve 33.

In generally, in control of the solenoid 69, after the valve of the injector 35 is opened, the current to be applied to the solenoid 69 is changed to the open valve state retaining current smaller than the inrush current required for opening the valve. However, in the present embodiment, since the inrush current larger than the open valve state retaining current is continuously applied even after the valve of the injector 35 opens, the temperature of the hydrogen gas in the injector 35 can be raised in a shorter time, or the temperature can be raised to a higher temperature in an equal temperature rise time, and a more efficient water reduction process can be realized.

Moreover, the control device 4 may perform the above water reduction process only in a case where the rotation number of the hydrogen pump 39 is less than or equal to a predetermined rotation number. For example, when a pipe length between the hydrogen pump 39 and the injector 35 is short, the water splashed from the circulation channel 32 is sometimes attached to the valve body 65 of the injector 35 positioned on the upstream side. However, when the rotation number of the hydrogen pump 39 is reduced, there is not any water splash from the downstream side, and the attachment of the water to the valve body 65 of the injector 35 can be inhibited.

Furthermore, the control device 4 may perform the above water reduction process, after ending all of the power generation by the fuel cell 10 (e.g., including the power generation for consumption of the hydrogen gas and the power generation for the pressure reduction of the hydrogen gas pipe system 3 performed after receiving a system stop command). According to this constitution, the water reduction process is performed in a state in which the production of the water accompanying the power generation and the supply of the gas required for the power generation are not performed, so that attachment of the water to the valve body 65 of the injector 35 can further effectively be inhibited.

Meanwhile, since the injector 35 has a remarkably small thermal capacity as compared with pipes (hereinafter referred to as the hydrogen system pipe) of the hydrogen supply channel 31 and the shutoff valve 33, a temperature drop gradient of the injector 35 after the system stop is larger than that of the hydrogen system pipe. That is, the injector 35 is cooled more easily than the hydrogen system pipe, and, after the system stops, the dew condensation is generated earlier in the injector than in the hydrogen system pipe.

Figure 5:
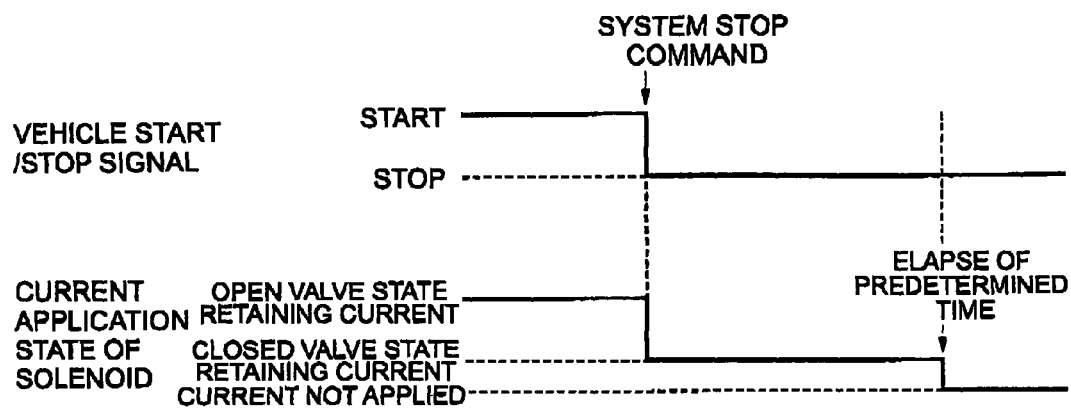
FIG. 5 is a diagram showing a relation between the current to be applied to the injector and a system-start/stop signal according to another embodiment of the fuel cell system shown in FIG. 1.

To solve the problem, as a dew condensation inhibiting process which is one configuration of the water reduction process according to the present invention, as shown in FIG. 5, on receiving a system stop command such as ignition OFF, the control device 4 may apply the closed valve state retaining current to the solenoid 69 of the injector 35 to retain the closed valve state, in other words, a current smaller than the open valve state retaining current during the usual operation for a predetermined time, and the device may then stop the application of the current.

In this case, a weak current smaller than the open valve state retaining current is applied to the solenoid 69 of the injector 35 for the predetermined time, whereby the solenoid 69 generates the heat to raise the temperature of the injector 35. Therefore, the dew condensation is generated earlier on the side of the hydrogen system pipe than in the injector 35, and the generation of the dew condensation in the injector 35 is inhibited. In consequence, the operation defect of the injector 35 due to the freezing is inhibited even below the freezing point.

It is noted that an application time of the closed valve state retaining current (a predetermined time) may be a preset fixed time, or a variable time arbitrarily set based on an outside air temperature or a temperature of the fuel cell 10 (or a temperature of a refrigerant for adjusting the temperature of the fuel cell 10). In the latter case, the application time of the closed valve state retaining current can be optimized, and further a time required for a system stop process including the above dew condensation inhibiting process can be shortened.

Figure 6:
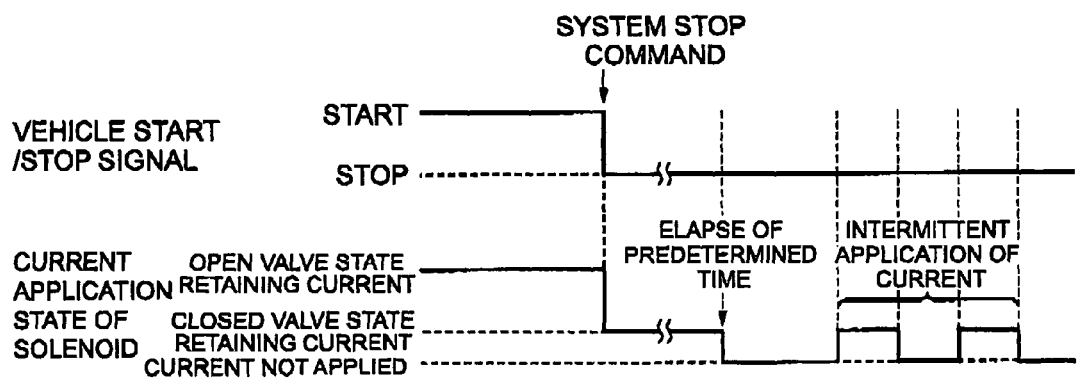
FIG. 6 is a diagram showing a relation between the current to be applied to the injector and a time elapsed after the system stop according to another embodiment of the fuel cell system shown in FIG. 1.

Moreover, the above dew condensation inhibiting process may be executed after the system stop, instead of or in addition to the execution on the system stop. When the dew condensation inhibiting process is executed after the system stop, as shown in, for example, FIG. 6, the control device 4 intermittently applies the closed valve state retaining current to the solenoid 69 of the injector 35 after the system stop. The turning on/off of the current during this intermittent application is controlled by, for example, a timer.

Furthermore, the control device 4 may execute the above dew condensation inhibiting process, that is, the application of the current to the solenoid 69 of the injector 35 when or after the system stops, in a case where it is predicted that the dew condensation is generated around the valve body of the injector 35.

In such a case, the execution of the dew condensation inhibiting process, which becomes useless in a case where the dew condensation is not generated, can be omitted. On the other hand, in case where the dew condensation inhibiting process is executed when the system stops, but the dew condensation may be generated owing to the subsequent environment change or the like, the generation of the dew condensation can be inhibited.

Here, it can be judged whether or not the dew condensation is generated in the injector 35, for example, by use of at least one of parameters typified by the outside air temperature, the temperature of the injector 35, the temperature of the fuel cell 10, the temperature of the hydrogen system pipe, and a resistance value of the injector 35 obtained from a value of a current sensor disposed at a driver for driving the injector 35.

Figure 7:
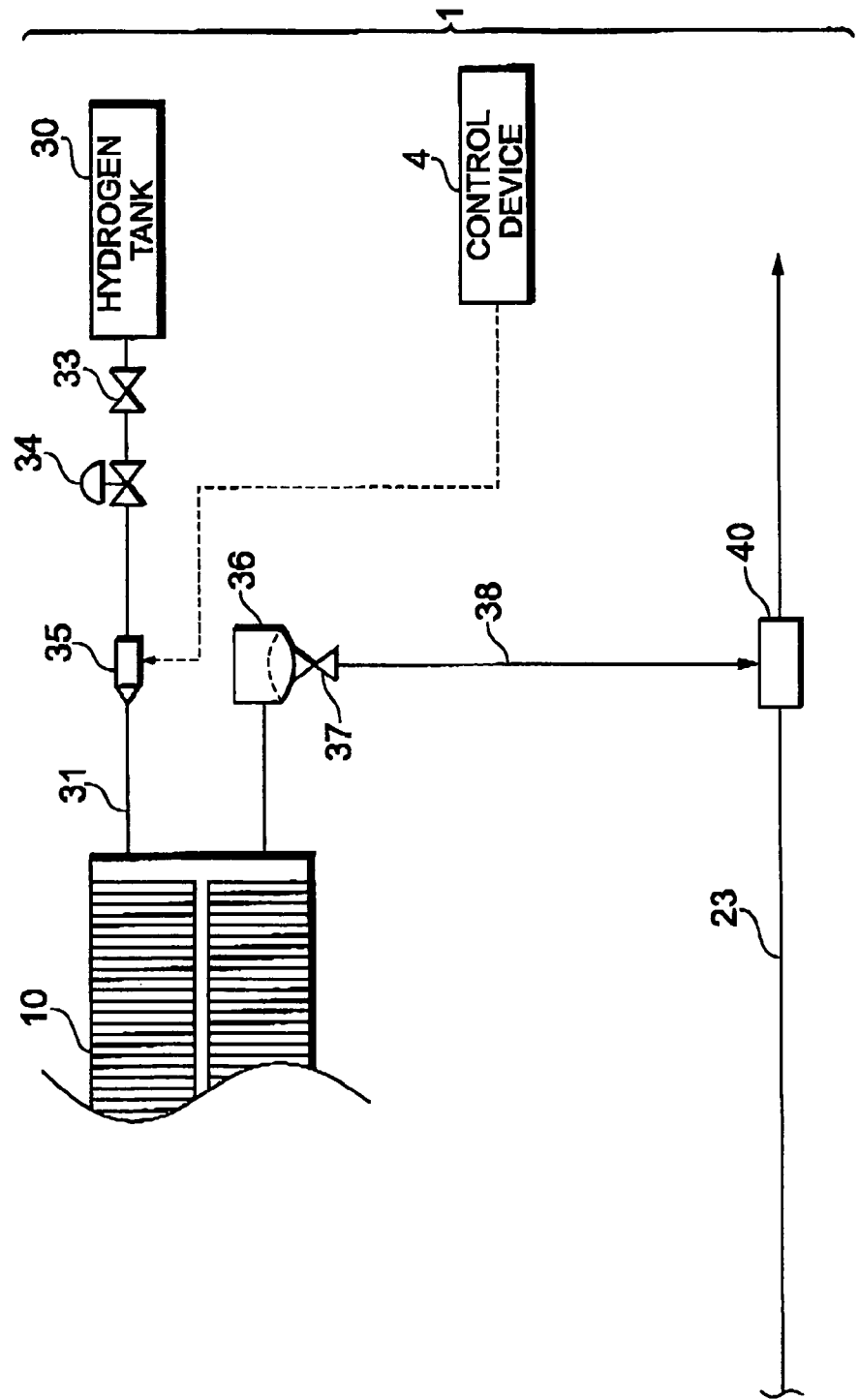
FIG. 7 is a constitution diagram showing still further embodiment of the fuel cell system shown in FIG. 1.

It is noted that in the above embodiment, an example has been described in which the hydrogen gas pipe system 3 of the fuel cell system 1 is provided with the circulation channel 32, but as shown in, for example, FIG. 7, a fuel cell 10 may directly be connected to a discharge channel 38 to omit the circulation channel 32. Instead of installing of the hydrogen pump 39 at the circulation channel 32, an ejector may be installed.

Moreover, in the above embodiments, an example has been described in which the fuel cell system according to the present invention is mounted on a fuel cell vehicle, but the fuel cell system according to the present invention may be mounted on various mobile bodies (a robot, a ship, an airplane, etc.) other than the fuel cell vehicle. The fuel cell system according to the present invention may be applied to a stationary power generation system for use as a power generation equipment for a construction (a house, a building or the like).

Industrial Applicability

According to the present invention, since water present around a valve body of an injector can be reduced when the system stops, an operation defect due to freezing in the injector can be suppressed, and start reliability in a low temperature environment can be improved. Therefore, the present invention can broadly be used in a fuel cell system having such a requirement and an operation stop method of the system.

The invention claimed is:

1. A fuel cell system comprising: a fuel cell; a gas supply system for supplying a reactant gas to this fuel cell; and an injector for adjusting a gas state on an upstream side of this gas supply system to supply the gas to a downstream side, wherein:
the injector includes an internal channel for communicating the upstream side of the injector with the downstream side of the injector, and a valve body movably arranged in the internal channel for changing an open/closed state of the channel; and
the system further including a water reduction device for reducing water at least around the valve body of the injector when or after the system stops,
wherein the injector includes a valve body driving part for driving the valve body by application of current, and
wherein the water reduction device controls the application of the current to the valve body driving part to reduce the water around the valve body.

2. The fuel cell system according to claim 1, wherein the water reduction means applies a current for retaining a closed valve state to the valve body driving part of the injector to raise a temperature of the reactant gas, and then opens a valve of the injector.

3. The fuel cell system according to claim 1, wherein:
the injector is disposed in a fuel gas supply system which communicates with a fuel electrode side of the fuel cell; and
the water reduction device reduces a pressure on the fuel electrode side of the fuel cell to lower than a target pressure after the system stops, before the valve of the injector is opened.

4. The fuel cell system according to claim 1, further comprising
a shutoff valve for intercepting the gas supply from a reactant gas supply source on the upstream side of the injector,
wherein the water reduction device closes the shutoff valve, then continuously applies a current required for opening the valve of the injector to the valve body driving part, opens the shutoff valve to supply the reactant gas from the reactant gas supply source to the injector, and after that, closes the valve of the injector and closes the shutoff valve.

5. The fuel cell system according to claim 1, further comprising:
a circulation channel for returning an off-gas of the reactant gas discharged from the fuel cell to the fuel cell; and a pump disposed in the circulation channel,
wherein the water reduction device performs a process to reduce the water around the valve body in a case where a rotation number of the pump is less than or equal to a predetermined rotation number.

6. The fuel cell system according to claim 1, wherein the water reduction device performs the process to reduce the water around the valve body, after ending all power generation by the fuel cell.

7. The fuel cell system according to claim 1, wherein the water reduction device applies a current for retaining the closed valve state to the valve body driving part of the injector for a predetermined time, and then stops the application of the current.

8. The fuel cell system according to claim 7, wherein the predetermined time is set based on a temperature of outside air or the fuel cell.

9. The fuel cell system according to claim 1, wherein the water reduction device intermittently applies the current to the valve body driving part of the injector after the system stops.

10. The fuel cell system according to claim 1, wherein the water reduction device applies the current to the valve body driving part of the injector in a case where it is predicted that dew condensation is generated around the valve body of the injector.

11. An operation stop method of a fuel cell system including a fuel cell, a gas supply system for supplying a reactant gas to this fuel cell and an injector for adjusting a gas state on an upstream side of the gas supply system to supply the gas to a downstream side, the method comprising:
    a step of reducing water at least around a valve body disposed in an internal channel of the injector when the system stops,
    wherein the injector includes a valve body driving part for driving the valve body by application of current; and
    wherein the step of reducing water comprises a step of controlling the application of the current to the valve body driving part to reduce the water around the valve body.

* * * * *